(12) United States Patent
Kuo et al.

(10) Patent No.: US 6,758,132 B1
(45) Date of Patent: Jul. 6, 2004

(54) ELECTRIC COOKING DEVICE SUITABLE FOR GRILLING AND BAKING FOODSTUFFS

(75) Inventors: Po-Chun Kuo, Tainan Hsien (TW); Chung-Ju Tsai, Kaohsiung Hsien (TW)

(73) Assignee: Tsann Kuen Enterprise Co., Ltd., Hsin-Chuang (TW)

( * ) Notice: Subject to any disclaimer, the term of this patent is extended or adjusted under 35 U.S.C. 154(b) by 0 days.

(21) Appl. No.: 10/658,869

(22) Filed: Sep. 9, 2003

(51) Int. Cl.⁷ .......................... A47J 37/00; A47J 37/06; A47J 37/08; A23L 1/00
(52) U.S. Cl. .............................. 99/340; 99/372; 99/375; 99/378; 99/400; 99/425; 99/444; 99/446; 219/386; 219/524
(58) Field of Search .......................... 99/331, 342, 344, 99/349, 339, 340, 352–355, 372–384, 400, 401, 422–425, 444–450; 219/401, 521, 524, 525, 386, 442, 452.11, 466.1, 467.1, 385, 439; 392/418, 422; 426/523, 520

(56) References Cited

U.S. PATENT DOCUMENTS

| | | | | |
|---|---|---|---|---|
| 4,142,094 A | * | 2/1979 | Barradas | 219/524 |
| 4,178,500 A | * | 12/1979 | Brindopke | 219/524 |
| 4,241,650 A | * | 12/1980 | John et al. | 99/372 |
| 4,403,540 A | * | 9/1983 | Erkelenz | 99/375 |
| 4,857,708 A | * | 8/1989 | DeMars | 219/385 |
| 4,987,827 A | * | 1/1991 | Marquez | 99/331 |
| 5,129,313 A | * | 7/1992 | Coppier | 99/376 |
| 5,138,938 A | * | 8/1992 | McClean | 99/331 |
| 5,606,905 A | * | 3/1997 | Boehm et al. | 99/375 |
| 5,845,562 A | * | 12/1998 | Deni et al. | 99/375 |
| 5,848,567 A | * | 12/1998 | Chiang | 99/375 |
| 6,276,263 B1 | * | 8/2001 | Huang | 99/375 |
| 6,429,409 B1 | * | 8/2002 | Siu | 219/450.1 |

\* cited by examiner

*Primary Examiner*—Timothy F. Simone
(74) *Attorney, Agent, or Firm*—Jonathan Alan Quine; Quine Intellectual Property Law Group, P.C.

(57) ABSTRACT

A base unit of an electric cooking device includes a grill plate that has front and rear edge portions opposite to each other along a plate axis. An oil-collecting hole is formed adjacent to the front edge portion. The grill plate has a top cooking surface that inclines rearwardly and upwardly from the front edge portion to the rear edge portion, that inclines downwardly from the plate axis to left and right edge portions of the grill plate, and that is formed with a plurality of curved grill ribs, each of which includes a portion extending from the left side of the oil-collecting hole to the plate axis, and a portion extending from the plate axis to the right side of the oil-collecting hole.

7 Claims, 6 Drawing Sheets

ELECTRIC COOKING DEVICE SUITABLE FOR GRILLING AND BAKING FOODSTUFFS

BACKGROUND OF THE INVENTION

1. Field of the Invention

The present invention relates to an electric cooking device, more particularly to an electric cooking device that is suitable for grilling and baking foodstuffs.

2. Description of the Related Art

As shown in FIGS. 1 and 2, a conventional electric cooking device includes a base unit 11 and a cover unit 12. The base unit 11 includes a lower housing 110 made of a heat resistant material, a lower cookware member 111 made of a heat conductive material and mounted in the lower housing 110, and an electric heating element 112 operatively coupled to the lower cookware member 111 for supplying heat to the lower cookware member 111. The cover unit 12 includes an upper housing 120 made of a heat resistant material, an upper cookware member 121 made of a heat conductive material and mounted in the upper housing 120, and an electric heating element 122 operatively coupled to the upper cookware member 121 for supplying heat to the upper cookware member 121. The upper housing 120 is mounted pivotally to the lower housing 110 such that the cover unit 12 is movable to a closed position relative to the base unit 11 so as to form a cooking chamber with the base unit 11.

The lower cookware member 111 includes a grill plate 14 and a surrounding wall 15 that extends upwardly from a periphery of the grill plate 14. The grill plate 14 is formed with an oil-collecting hole 141 adjacent to a front edge portion thereof, and has a top surface formed with a plurality of straight grill ribs 142. Each of the grill ribs 142 has one end adjacent to the oil-collecting hole 141, and generally extends in a radial outward direction relative to the oil-collecting hole 141.

In use, oil that is generated when cooking foodstuffs on the grill plate 14 is drained through the oil-collecting hole 141.

In the conventional electric cooking device, since the grill ribs 142 generally extend in radial directions, the grill ribs 142, are more closely arranged at the vicinity of the oil-collecting hole 141 than at the vicinity of a rear edge portion of the grill plate 14. The arrangement as such results in uneven heat distribution that tends to scorch portions of the foodstuffs on the grill plate 14.

SUMMARY OF THE INVENTION

Therefore, the object of the present invention is to provide an electric cooking device that can overcome the aforesaid drawback associated with the prior art.

According to the present invention, an electric cooking device comprises a base unit that includes a lower housing, a lower cookware member mounted in the lower housing, and an electric heating element operatively coupled to the lower cookware member for supplying heat to the lower cookware member.

The lower cookware member includes a grill plate that has front and rear edge portions opposite to each other in a first direction, and left and right edge portions opposite to each other in a second direction transverse to the first direction and interconnecting the front and rear edge portions. The grill plate defines a plate axis that extends in the first direction and that is disposed between the left and right edge portions.

The grill plate has a top cooking surface that inclines rearwardly and upwardly from the front edge portion to the rear edge portion relative to a horizontal plane. The top cooking surface of the grill plate further inclines downwardly from the plate axis to each of the left and right edge portions.

The grill plate is formed with an oil-collecting hole adjacent to the front edge portion and disposed at the plate axis. The oil-collecting hole has left and right sides relative to the plate axis.

The top cooking surface of the grill plate is formed with a plurality of curved grill ribs. Each of the grill ribs includes a curved left rib portion extending from the left side of the oil-collecting hole to the plate axis, and a curved right rib portion extending from the plate axis to the right side of the oil-collecting hole.

The grill ribs have different arc lengths and intersect the plate axis at different distances with respect to the oil-collecting hole such that longer ones of the grill ribs surround shorter ones of the grill ribs.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
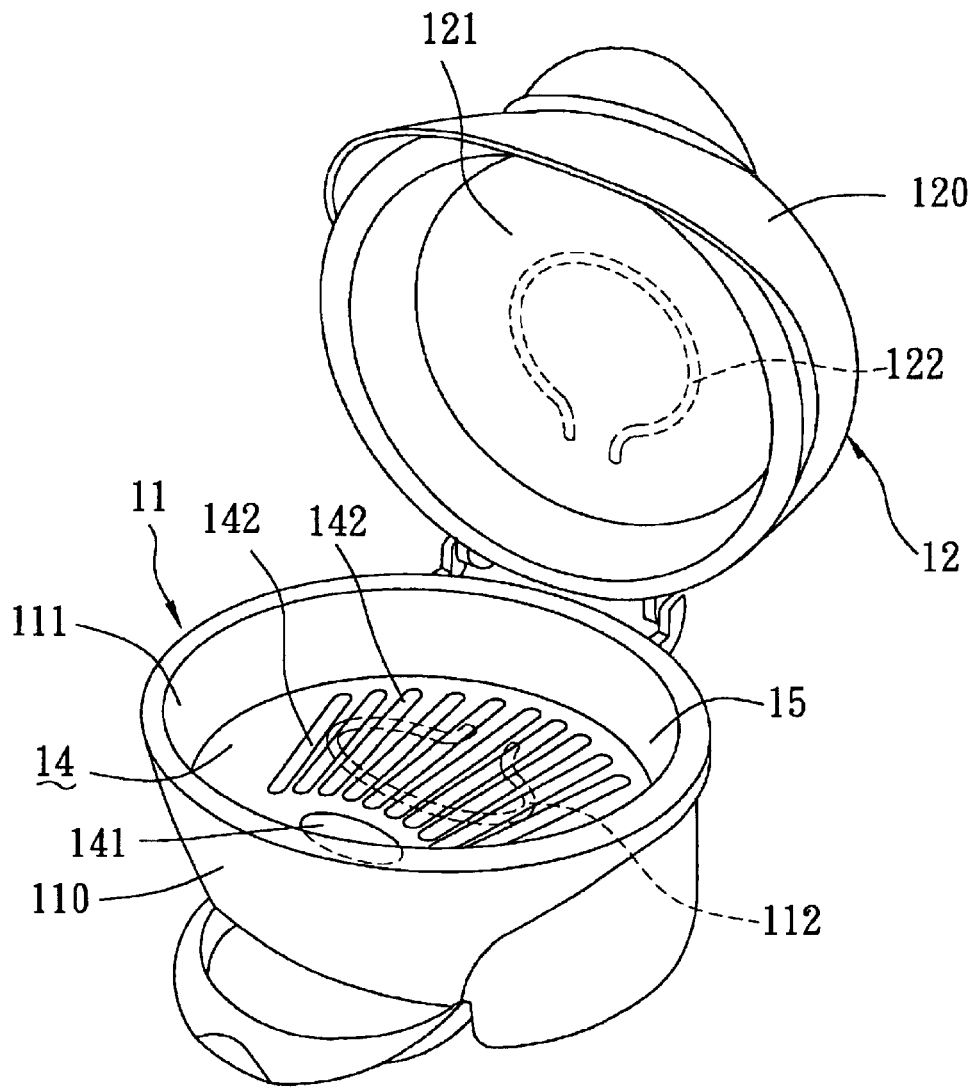
FIG. 1 is an assembled perspective view of a conventional electric cooking device.
Figure 2:
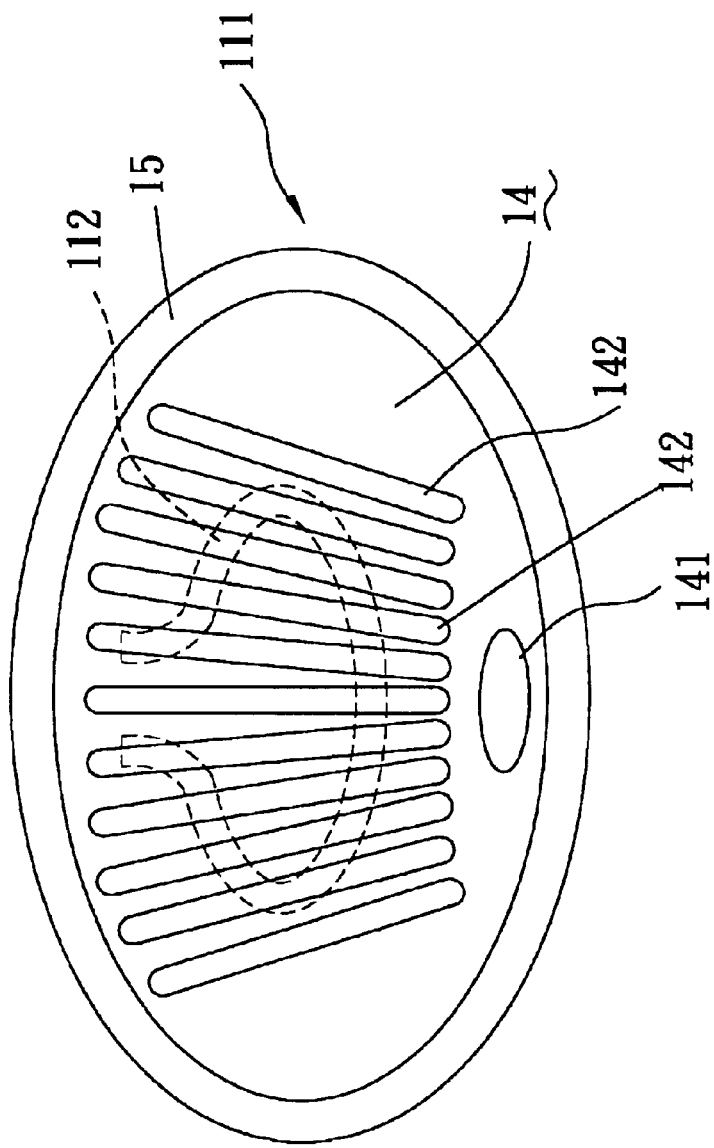
FIG. 2 is a schematic top view of a lower cookware member of the conventional electric cooking device.
Figure 3:
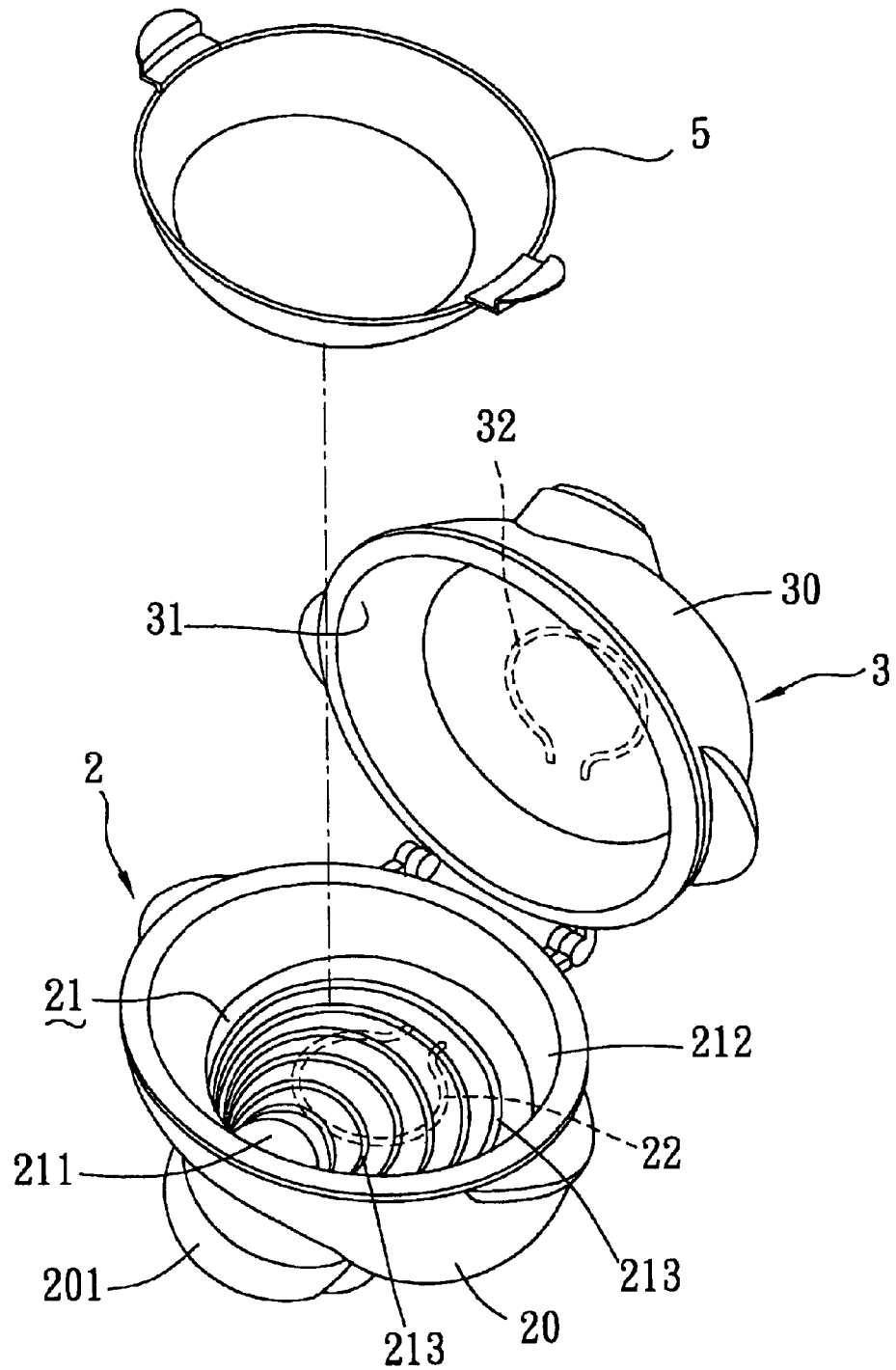
FIG. 3 is a partly exploded perspective view of the preferred embodiment of an electric cooking device according to the present invention.
Figure 4:
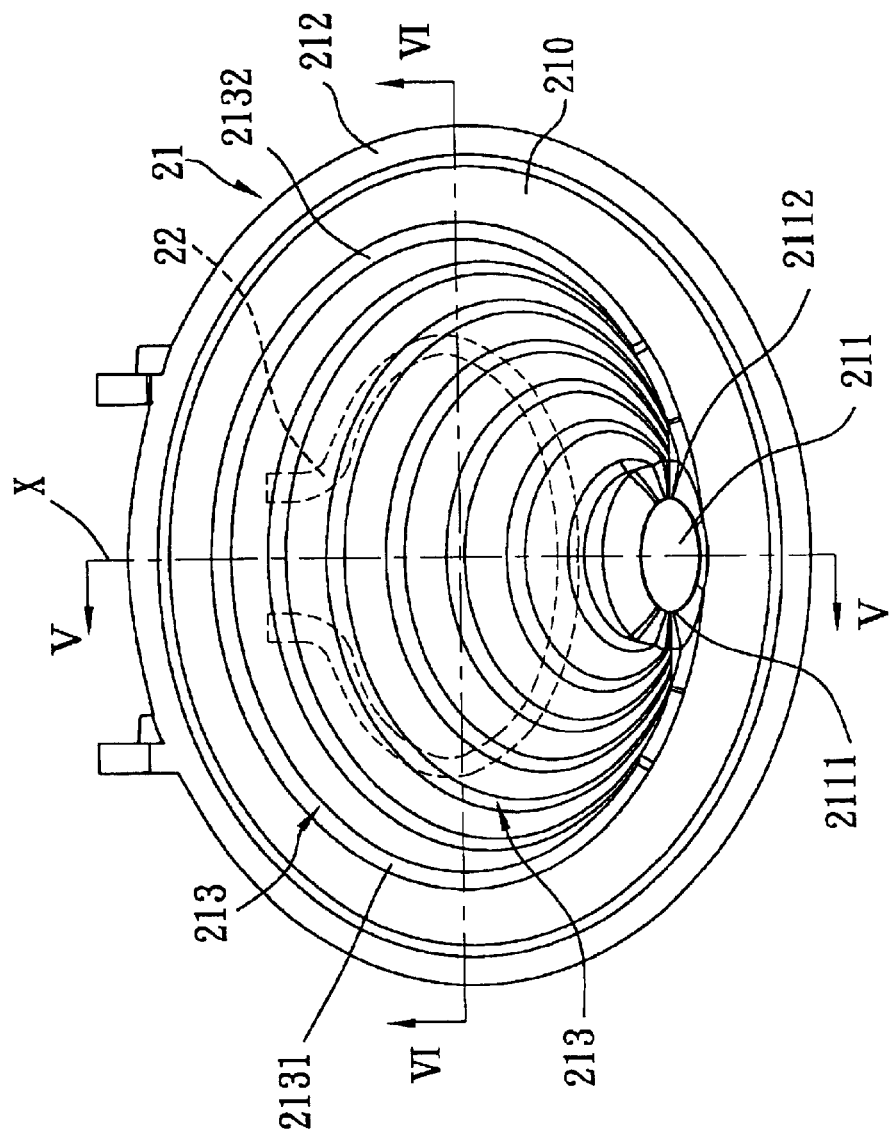
FIG. 4 is a schematic top view of a lower cookware member of a base unit of the preferred embodiment.

Referring to FIGS. 3 and 4, the preferred embodiment of an electric cooking device according to the present invention is shown to include a base unit 2, a cover unit 3, and a baking pan 5.

The base unit 2 includes a lower housing 20 made of a heat resistant material, a lower cookware member 21 made of a heat conductive material and mounted in the lower housing 20, and a first C-shaped electric heating element 22 operatively coupled to the lower cookware member 21 for supplying heat to the lower cookware member 21. The lower cooking member 21 includes a grill plate 210 and a surrounding wall 212 that extends upwardly from a periphery of the grill plate 210.

The cover unit 3 includes an upper housing 30 made of a heat resistant plastic material, an upper cookware member 31 made of a heat conductive metal material and mounted in the upper housing 30, and a second C-shaped electric heating element 32 operatively coupled to the upper cookware member 31 for supplying heat to the upper cookware member 31. The upper housing 30 is mounted movably to the lower housing 20 such that the cover unit 3 is pivotable to a closed position relative to the base unit 2 so as to form a cooking chamber with the base unit 2.

Figure 5:
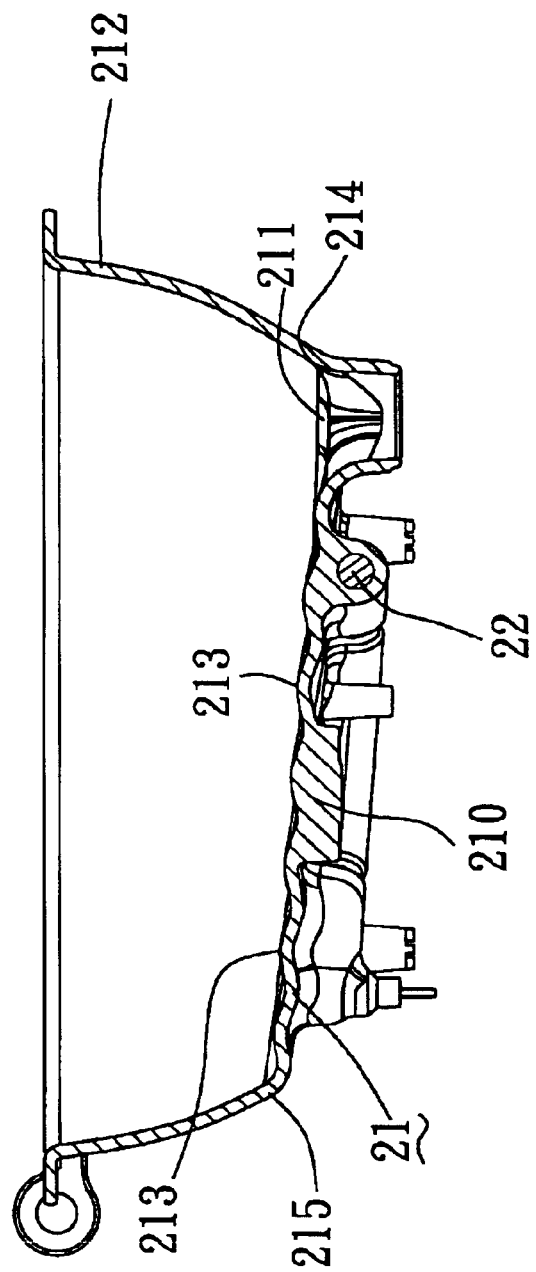
FIG. 5 is a sectional view of the preferred embodiment, taken along lines V—V in FIG. 4.
Figure 6:
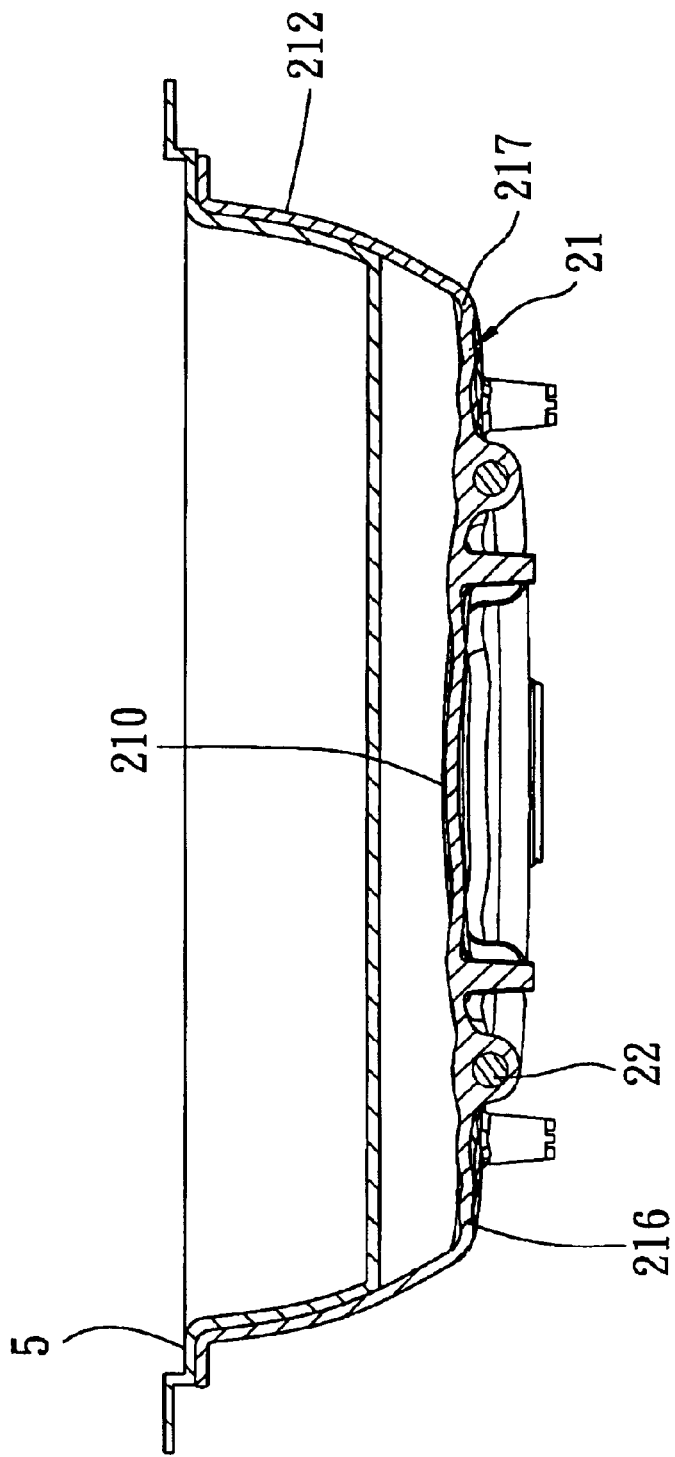
FIG. 6 is another sectional view of the preferred embodiment, taken along lines VI—VI in FIG. 4.

Referring further to FIGS. 5 and 6, the grill plate 210 has front and rear edge portions 214, 215 opposite to each other in a first direction, and left and right edge portions 216, 217 opposite to each other in a second direction transverse to the first direction and interconnecting the front and rear edge portions 214, 215. The grill plate 210 defines a plate axis (X) that extends in the first direction and that is disposed between the left and right edge portions 216, 217.

The grill plate 210 has a top cooking surface that inclines rearwardly and upwardly from the front edge portion 214 to the rear edge portion 215 at an angle ranging from 3 to 8 degrees relative to a horizontal plane, as best shown in FIG. 5. The top cooking surface of the grill plate 210 further inclines downwardly from the plate axis (X) to each of the left and right edge portions 216, 217 at an angle ranging from 2 to 10 degrees relative to an inclined reference plane which has the plate axis (X) extending therein, as best shown in FIG. 6.

The grill plate 210 is formed with an oil-collecting hole 211 adjacent to the front edge portion 214 and disposed at the plate axis (X). The oil-collecting hole 211 has left and right sides 2111, 2112 relative to the plate axis (X), as best illustrated in FIG. 4.

The top cooking surface of the grill plate 21 is formed with a plurality of curved grill ribs 213. Each of the grill ribs 213 includes a curved left rib portion 2131 extending from the left side 2111 of the oil-collecting hole 211 to the plate axis (X), and a curved right rib portion 2132 extending from the plate axis (X) to the right side 2112 of the oil-collecting hole 211, as best shown in FIG. 4.

The grill ribs 213 have different arc lengths and intersect the plate axis (X) at different distances with respect to the oil-collecting hole 211 such that longer ones of the grill ribs 213 surround shorter ones of the grill ribs 213.

The base unit 2 further includes an oil-collecting box 201 mounted removably under the oil-collecting hole 211 for collecting oil that drips through the latter.

In use, foodstuffs are placed on the top cooking surface of the grill plate 210. As the top cooking surface inclines downwardly from the rear edge portion 215 to the front edge portion 214 of the grill plate 210 and from the plate axis (X) to the left and right edge portions 216, 217 of the grill plate 210, and as an inclined annular groove is formed between each adjacent pair of the grill ribs 213, oil that is generated during grilling of the foodstuffs on the grill plate 210 will be guided to the oil-collecting hole 211 for subsequent collection in the oil-collecting box 201.

Due to the curved grill ribs 213 that define annular grooves thereamong, a more even distribution of the grill ribs 213 throughout the top cooking surface of the grill plate 210 is possible such that the drawback of uneven heat distribution commonly encountered with the use of the straight grill ribs of the prior art can be avoided. Furthermore, due to the inclined configuration of the grill plate 210, clearances between the foodstuff and the grill plate 210 can be increased to further reduce the risk of scorching.

Moreover, aside from grilling foodstuffs, the electric cooking device of this invention is also suitable for baking foodstuffs, such as baked rice casserole. Particularly, as shown in FIG. 6, the baking pan 5 has a rim that is supported removably on a top edge of the surrounding wall 212 of the lower cookware member 21. The foodstuff to be baked is then placed in the baking pan 5.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An electric cooking device comprising a base unit that includes a lower housing, a lower cookware member mounted in said lower housing, and a first electric heating element operatively coupled to said lower cookware member for supplying heat to said lower cookware member, wherein said lower cookware member includes a grill plate, said grill plate having front and rear edge portions opposite to each other in a first direction, and left and right edge portions opposite to each other in a second direction transverse to the first direction and interconnecting said front and rear edge portions, said grill plate defining a plate axis that extends in the first direction and that is disposed between said left and right edge portions, said grill plate having a top cooking surface that inclines rearwardly and upwardly from said front edge portion to said rear edge portion relative to a horizontal plane, said top cooking surface of said grill plate further inclining downwardly from the plate axis to each of said left and right edge portions, said grill plate being formed with an oil-collecting hole adjacent to said front edge portion and disposed at the plate axis, said oil-collecting hole having left and right sides relative to the plate axis, said top cooking surface of said grill plate being formed with a plurality of curved grill ribs, each of said grill ribs including a curved left rib portion extending from said left side of said oil-collecting hole to the plate axis, and a curved right rib portion extending from the plate axis to said right side of said oil-collecting hole, said grill ribs having different arc lengths and intersecting the plate axis at different distances with respect to said oil-collecting hole such that longer ones of said grill ribs surround shorter ones of said grill ribs.

2. The electric cooking device as claimed in claim 1, further comprising a cover unit including an upper housing, an upper cookware member mounted in said upper housing, and a second electric heating element operatively coupled to said upper cookware member for supplying heat to said upper cookware member, said upper housing being mounted movably to said lower housing such that said cover unit is movable to a closed position relative to said base unit so as to form a cooking chamber with said base unit.

3. The electric cooking device as claimed in claim 1, wherein said lower cookware member further includes a surrounding wall that extends upwardly from a periphery of said grill plate.

4. The electric cooking device as claimed in claim 3, further comprising a baking pan having a rim that is supported removably on a top edge of said surrounding wall of said lower cookware member.

5. The electric cooking device as claimed in claim 1, wherein said top cooking surface of said grill plate inclines rearwardly and upwardly from said front edge portion to said rear edge portion at an angle ranging from 3 to 8 degrees relative to the horizontal plane.

6. The electric cooking device as claimed in claim 1, wherein said top cooking surface of said grill plate inclines downwardly from the plate axis to each of said left and right edge portions at an angle ranging from 2 to 10 degrees relative to an inclined reference plane which has the plate axis extending therein.

7. The electric cooking device as claimed in claim 1, wherein said base unit further includes an oil-collecting box mounted removably under said oil-collecting hole.

\* \* \* \* \*